United States Patent [19]

Fischer

[11] Patent Number: 4,820,363
[45] Date of Patent: Apr. 11, 1989

[54] TENSIONING AND CONNECTING APPARATUS FOR CONNECTING OVERLAPPING STRAP ENDS OF SYNTHETIC MATERIAL

[75] Inventor: Karl Fischer, Stansstad, Switzerland

[73] Assignee: Strapex AG, Wohlen, Switzerland

[21] Appl. No.: 819,581

[22] Filed: Jan. 17, 1986

[30] Foreign Application Priority Data

Jan. 23, 1985 [CH] Switzerland .......................... 271/85

[51] Int. Cl.⁴ ...................... B32B 31/00; B65B 13/34
[52] U.S. Cl. .............................. 156/494; 100/33 PB;
156/73.5; 156/502; 156/530; 156/579; 156/580
[58] Field of Search ....................... 156/73.5, 494, 502,
156/530, 579, 580; 100/33 PB; 53/399, 592

[56] References Cited
U.S. PATENT DOCUMENTS

| 3,442,735 | 5/1969 | Stensaker | 156/580 |
| 4,227,949 | 10/1980 | Wehr | 156/73.5 |
| 4,305,774 | 12/1981 | Wedeking | 156/73.5 |
| 4,595,433 | 6/1986 | Ford | 156/502 |
| 4,605,456 | 8/1986 | Annis | 156/494 |

FOREIGN PATENT DOCUMENTS

| 2825332 | 12/1979 | Fed. Rep. of Germany ... 100/33 PB |
| 3200951 | 4/1983 | Fed. Rep. of Germany . |
| 1500570 | 9/1967 | France . |
| 2372733 | 6/1978 | France . |
| 598917 | 5/1978 | Switzerland ........................ 156/580 |
| 637587 | 8/1983 | Switzerland . |

Primary Examiner—George F. Lesmes
Assistant Examiner—J. Davis
Attorney, Agent, or Firm—Werner W. Kleeman

[57] ABSTRACT

A band or strap of synthetic material, for instance thermoplastic material, placed as a ligature around a package or article to be wrapped is tensioned and its ends connected together, for instance by friction welding, by means of a tensioning and connecting apparatus for connecting overlapping strap ends of synthetic or thermoplastic material. The tensioning and connecting apparatus comprises a clamping member or shoe for restraining or holding the innermost end of the band or strap, a connecting or friction welding device and a tensioning device in the form of a slotted wheel located subsequent to the connecting or friction welding device as viewed in the direction from which tension is applied. The connecting or welding procedure involves a transverse motion such as vibration or oscillation of the innermost, free end of the strap or band relative to the longitudinal axis of the strap. The welding element of the connecting or friction welding device is driven by an electric motor which is powered by a built-in battery. A single actuation lever with a rotating knob or control grip allows execution of all operating procedures or functions. The tensioning and connecting apparatus can be used independently of an electrical power supply network, is versatile and is operable at any location.

22 Claims, 4 Drawing Sheets

Fig. 1

TENSIONING AND CONNECTING APPARATUS FOR CONNECTING OVERLAPPING STRAP ENDS OF SYNTHETIC MATERIAL

CROSS REFERENCE TO RELATED APPLICATION

This application is related to the commonly assigned, copending U.S. application Ser. No. 06/812,441, filed Dec. 23, 1985, and entitled "Apparatus For Connecting Overlapping Ends Of Thermoplastic Band Material".

BACKGROUND OF THE INVENTION

The present invention broadly relates to a tensioning and connecting apparatus for connecting overlapping strap ends of synthetic or thermoplastic material tensioned around at least one package or article to be wrapped and possessing a frictional welding device located ahead or forwardly of a tensioning device as seen in the direction from which tension is applied.

In its more particular aspects, the tensioning and connecting apparatus of the present invention comprises a friction welding device possessing a clamping ram or shoe positioned above a gap for accommodating the mutually overlapping ends of the band or strap. A welding element comprising a jaw or tongue is positioned below the gap and opposite to the clamping shoe and, by vibrating or oscillating, generates frictional heat. A retention device is capable of engaging with or holding the tensioned mutually overlapping ends of the band or strap.

In other words, the tensioning and connecting apparatus of the present invention is for tensioning and connecting mutually overlapping ends of a strap of synthetic material and comprises a tensioning device defining a direction of tensioning, a friction welding device arranged ahead or forwardly of the tensioning device in the direction of tensioning, and means defining a gap for accommodating the mutually overlapping ends of the strap. The friction welding device comprises a clamping shoe arranged above the gap. A welding element is arranged opposite the clamping shoe beneath the gap and is oscillated in relation to the clamping shoe for generating frictional heat. A retention means is provided for retaining the strap in a tensioned state.

A known manually operated or hand-operated tensioning and connecting apparatus of the initially mentioned type is known from the Swiss Pat. No. 637,587, granted Aug. 15, 1983, and serves for wrapping or banding a package or article or a number of articles which are to be bundled or jointly wrapped with a band or strap of thermoplastic material serving as a ligature. To apply tension to the band or strap, this known tensioning and connecting apparatus possesses a tensioning wheel which engages with the surface of the band or strap and is coupled to an electric motor or pneumatic motor by means of a dog clutch or coupling. After the tensioning procedure has been accomplished, the dog clutch or coupling is released so that the tensioning wheel remains stationary. In order to maintain tension in the strap after the dog coupling is released, a band or strap clamping device of the tensioning and connecting apparatus serves as a bolding or retention mechanism by engaging with both of the overlapping strap ends. This band or strap clamping device is located ahead of This band or strap clamping device is located ahead of the welding or connecting device as seen in the direction from which tension is applied. Both ends of the strap are under tension in the vicinity of the welding device. In order to obtain sufficient relative motion between both strap ends to produce a frictional weld despite the tension applied, both the outermost strap end and the innermost strap end are set into motion. These overlapping strap ends are pivoted or rotatively oscillated about a pivot axis which lies in the center of the welding spot.

The generation of relative motion is hindered when the strap is tensioned and laterally held. Therefore it is to be noted that in the initially mentioned type of tensioning and connecting apparatus, the possibility exists of lifting the tensioning wheel from the strap during the welding operation. In this way the lateral blockage of the outermost strap end, which is still connected with the supply reel, is at least partially neutralized or nullified in one direction of the strap. The innermost strap end, however, remains tensioned and laterally held in the vicinity of the welding device between the strap clamping or retention device and a tensioning shoe. To overcome the ensuing hindrance, the drive motor of the welding device must be designed with sufficient power output or performance. Since the same motor also serves to drive the tensioning wheel, it is necessary to take into consideration the power or torque requirements of the tensioning wheel when designing the motor. Other than the costs associated with a powerful motor, there is no practical difficulty in adequately and sufficiently designing a motor for operation from an electrical power supply network or from a compressed air source or pneumatic network. The design of such a tensioning and connecting apparatus for operation independently of such a network presents the difficulty that the batteries necessary for such power requirements would exceed the size and weight limitations of a manual device.

A further disadvantage of the initially mentioned type of tensioning and connecting apparatus is that only limited tensioning force can be applied by the tensioning wheel due to the risk of possible damage to the strap. This limited tensioning force is not adequate for certain applications, for example, for wrapping or binding together objects such as panels or pipes having long, smooth surfaces.

A further known tensioning and connecting apparatus of the initially mentioned type is known from the West German Patent Publication No. 3,200,951, published Apr. 14, 1983. This apparatus applies tension to a strap by means of a tensioning or gripping jaw which engages the surface of the strap and is driven or actuated by an eccentric mechanism. The strap is held by a retention jaw which is positioned directly in front of the tensioning or gripping jaw and which substantially prevents backward slippage or return. The welding device of this tensioning and connecting apparatus, as seen in the direction from which tension is applied, is positioned subsequent to the tensioning device and comprises a pivotably mounted jaw which engages with the outermost strap end and is pivotable transversely to the longitudinal axis of the strap. The outermost strap end lies between the tensioning element and the supply reel during the welding operation. Its freedom of movement is thus impaired and the drive motor of the welding device must therefore be designed to have sufficient power capacity or performance. Applying tension by means of a tensioning or gripping jaw is burdened with essentially the same disadvantages as applying tension by means of a tensioning wheel.

SUMMARY OF THE INVENTION

Therefore, with the foregoing in mind, it is a primary object of the present invention to provide a new and improved construction of a tensioning and connecting apparatus for connecting continually overlapping ends of a strap of synthetic or thermoplastic material and which does not exhibit the aforementioned drawbacks and shortcomings of the prior art constructions.

Another and more specific object of the present invention aims at providing a new and improved construction of a transioning and connecting apparatus of the previously mentioned type for connecting mutually overlapping ends of a strap of synthetic or thermoplastic material and which apparatus operates independently of an electrical power supply network.

Yet a further significant object of the present invention aims at providing a new and improved construction of a tensioning and connecting apparatus of the character described which is relatively simple in construction and design, extremely economical to manufacture, highly reliable in operation, not readily subject to breakdown or malfunction and requires a minimum of maintenance and servicing.

Now in order to implement these and still further objects of the invention, which will become more readily apparent as the description proceeds, the tensioning and connecting apparatus of the present invention is manifested by the features that the clamping device is positioned subsequent to the welding device as seen in the direction from which tension is applied, that the welding element comprises a welding jaw or tongue which engages the lowermost free strap end and which is driven or actuated in a transverse direction with respect to the longitudinal axis of the strap for producing frictional heat and which moves the lowermost strap end relative to the uppermost strap end which is held substantially stationary or fixed by the clamping shoe.

In other words, the tensioning and connecting apparatus of the present invention is manifested by the features that the retention means are arranged subsequent to the friction welding device in the direction of tensioning, straps. Means are provided for oscillating during the welding element comprising a welding tongue for engaging a lowermost free end of the mutually overlapping ends of the strap and the clamping shoe being provided for immobilizing an uppermost end of the mutually overlapping ends of the welding tongue substantially transverse to the strap for moving the lowermost free end relative to the uppermost end.

The present invention provides a solution for connecting or welding together the overlapping strap ends of a synthetic or a thermoplastic material in which only the innermost strap end is moved substantially transverse to the longitudinal axis of the strap. The strap is neither hindered from moving in a lateral direction non bindered by a tensioning element nor by an engagement element. The free movement of the innermost strap end permits the use of a drive motor whose power consumption is low enough to be supplied without problem by a portable battery.

A preferred embodiment of the invention comtemplates that the holding or clamping device may comprise a locking pawl integrally formed with the tensioning device. The necessity of a holding or clamping device engaging the strap is thereby eliminated as the tensioning device, coacting with its associated locking pawl, takes over the engagement or retention function after the tensioning procedure is completed.

According to a further preferred embodiment of the invention, the tensioning device comprises a slotted wheel which is coupled to an actuating lever and permits a manual or hand-operated tensioning procedure. The slotted wheel as the tensioning element permits practically any desired tension to be produced in the strap, even up to the tearing or rupture point of the strap. The manual or hand-operated tensioning procedure permits the design of an actuating or drive mechanism which need only take into consideration the power requirements of the friction welding device.

A further contemplated embodiment has the welding jaw or tongue supported by at least one roller. The frictional resistance of the welding jaw or tongue is thereby reduced to a minimum. Such an embodiment is also compression forces without appreciable wear. The rolling particularly well suited to taking-up large pressure or members can either be rollers or balls.

A driving or connecting rod may be linked or coupled to the welding jaw or tongue by means of an eccentric mechanism or cam. Actuating or driving the welding jaw or tongue by means of a driving rod linked to it provides for a minimum of transmission members between the eccentric mechanism or cam and the welding jaw or tongue. In such an embodiment, the drive motor may be most advantageously reclined to permit a flat construction form of the tensioning and connecting apparatus.

The eccentric mechanism or cam is coupled to a motor, preferably a direct-current electric motor, which can connected with a battery or storage battery, such as an accumulator, contained within the tensioning and connecting apparatus. Compared with prior art constructions, this preferred embodiment makes possible significantly reduced power requirements of the motor. The battery may advantageously be of the rechargeable type.

The clamping shoe is coupled to the actuating lever for being lowered onto the band or strap. The actuating lever used for tensioning the strap also serves to lower the clamping shoe onto the strap, thereby eliminating the necessity of a separate actuating lever.

The clamping shoe is resiliently biased or loaded by means of an adjustable plate or cup spring, i.e. a Belleville washer spring. This ensures that the pressure applied by the clamping shoe to the ends of the strap to be connected or welded together is uniformly constant and is a function of the adjustment of the plate or cup spring and is not a function of the temperament of the operator.

It is also contemplated to provide a bell crank lever between the actuating lever and the clamping shoe for lowering the clamping shoe onto the strap.

The use of the bell crank lever for lowering the clamping shoe permits easy operation by means of the actuating lever. Only a slight resistance acting on the actuating lever must be overcome, especially during the welding or connecting procedure. A hinged or jointed bell crank lever also facilitates adjustment for the accommodation of different thicknesses of strap.

The actuating lever possesses a switching or reversing mechanism, i.e. a selective engagement mechanism, so that either the tensioning device or the friction welding device can be actuated. The actuating lever thus actuates both the tensioning device as well as the friction welding device.

The selective engagement mechanism possesses a switching or reversing element, i.e. a selective engagement member, which is actuated by a rotatable knob or control grip positioned on the actuating lever which, in one position, connects the actuating lever to a ratchet wheel of the tensioning device and, in the other position, connects the actuating lever to a transmission linkage for lowering or depressing the clamping shoe onto the band or strap.

The transmission linkage possesses an eccentric mechansim, such as an eccentric or a cam wheel which can be pivoted about the same axis as the ratchet wheel and which is connected by means of a pivot or hinged joint with the bell crank lever. The selective engagement mechanism can in one position engage the ratchet wheel with a locking pawl and, in the other position, can engage the eccentric mechanism or cam. As the ratchet wheel and the eccentric mechanism or cam can be positioned immediately mutually adjacent on the same shaft, a relatively slight displacement movement of the pawl is enough to switch from the one to the other position.

The selective engagement mechanism possesses a return spring for effecting a return of the selective engagement mechanism to the ratchet wheel. This assures that when putting the tensioning and connecting apparatus into operation, the actuating lever is always in the tensioning position in order to simplify the operation as much as possible.

The transmission linkage used to lower or depress the clamping shoe is coupled with a switch for actuating the motor in such a manner that the motor is actuated before an axial clamping pressure is manifested or achieved. The motor is switched on by actuation of the actuating lever to the lower position so that it is not necessary to operate a separate switch to activate or energize the motor. Furthermore, the motor does not have to operate under the greatest or maximum load.

A deactivation switch or interrupter located in the current supply circuit of the motor opens after a predetermined number of vibrations or oscillations of the welding jaw or tongue, thus deactivating the motor. The motor is switched off as a function of the number of vibrations or oscillations of the welding jaw or tongue so that continual, uniform connections or welds are possible, independent of the operator. Deactivation of the motor before release of the clamping connection, however, is necessary in order to guarantee by means of a cooling period that the weld connection has solidified.

The retention mechanism possesses a locking pawl engaging the ratchet wheel. The transmission linkage is capable of being arrested or stopped in the lowered or depressed position of the clamping shoe by a second locking pawl. Both locking pawls are connectable with the actuation lever by means of a release member and able to release the locking position when the actuating lever is moved opposite to the direction of tensioning or of lowering to such an extent that a stop member is reached. This assures that both modes of operation, "tensioning" and "clamping", are maintained without the necessity of having to hold the actuating lever in a particular position. Only after a movement of the actuating lever in a direction opposite to the direction of tensioning or clamping are the tensioning device and the clamping shoe released.

A knife or cutter provided for severing or cutting the outermost end of the band or strap is coupled in such manner to the welding jaw or tongue that it is driven with the same stroke as and synchronously to the movement of the welding jaw or tongue. This assures that the cutter only severs the outermost strap end and does not damage the innermost strap end, even if it comes to rest on the innermost strap end, as no relative motion occurs between the cutter and the innermost strap end.

The invention further contemplates that the cutter may be resiliently biased or loaded by a torsion spring in the direction of the outermost strap end and may be coupled with the clamping punch in such a way that they can be lowered simultaneously. The cutter is actuated by the motion of the actuating lever so that the cutting or severing operation must not be especially paid attention to by the operator.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
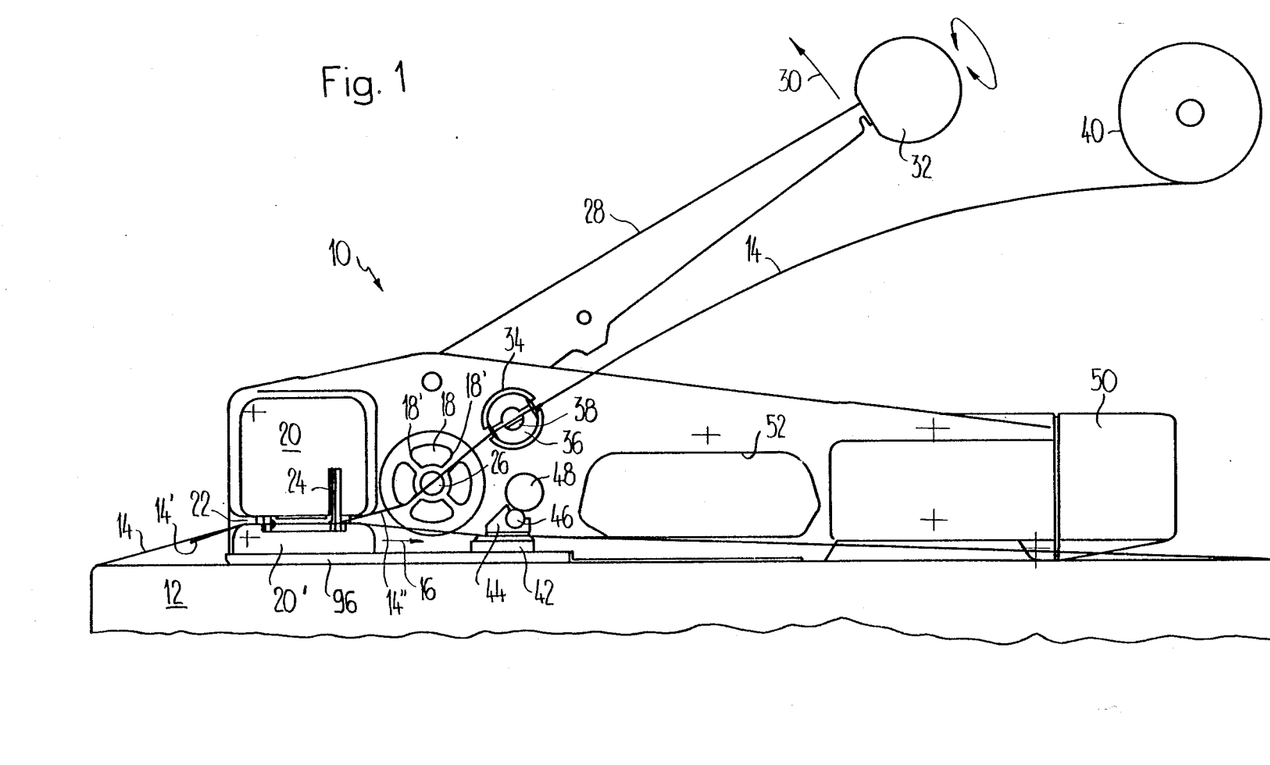
FIG. 1 shows a side view of an illustrative embodiment of the tensioning and connecting apparatus resting on a package or article to be wrapped, including a band or strap inserted into the tensioning and connecting apparatus.

Describing now the drawings, it is to be understood that to simplify the showing thereof only enough of the structure of the tensioning and connecting apparatus has been illustrated therein as is needed to enable one skilled in the art to readily understand the underlying principles and concepts of this invention. Turning now specifically to FIG. 1 of the drawings, the arrangement illustrated therein by way of example and not limitation will be seen to comprise a tensioning and connecting apparatus 10 for connecting mutually overlapping ends of a strap of a synthetic, e.g. a thermoplastic, material placed upon a package or article 12 to be wrapped. Around the package or article 12 to be wrapped there is placed the strap or band 14 of synthetic or thermoplastic material to be welded together at the innermost strap end 14' of the strap 14 and the outermost strap end 14" of the strap 14.

The tensioning and connecting apparatus 10 comprises a friction welding device 20, 20' comprising a friction welding device upper part 20 and a lower part 20' located ahead of a tensioning device 18, 18' as seen in the direction of the arrow 16 from which tension is applied. A gap 22, which is laterally open to admit the mutually overlapping innermost strap end 14' and outermost strap end 14", is positioned between the friction welding device upper part 20 and the lower part 20'. The friction welding device 20, 20' has a cutter or knife 24 used to sever or cut the outermost strap end 14" and positioned directly subsequent to the weld spot as seen in the direction from which tension is applied.

The tensioning device 18, 18' essentially comprises a slotted wheel 18 with two crossed-slots 18' to admit or accept the outermost strap end 14". If the slotted wheel 18 is turned in a counter-clockwise direction about a shaft 26, the strap 14 extending around the package or article 12 to be wrapped is tensioned in the direction of the arrow 16. To rotate the slotted wheel 18 in this counter-clockwise direction, an actuating lever 28, also mounted on the shaft 26, is moved or swung in a direction of the arrow 30. Moving or swinging the actuating lever 28 in the direction of the arrow 30 causes the slotted wheel 18 to rotate counter-clockwise due to a ratchet wheel 58, not particularly shown in FIG. 1 but shown in FIGS. 3 and 4, and mounted on the shaft 26. The slotted wheel 18 is held in the tensioned position by a locking pawl 118 which is also not particularly shown in FIG. 1 but in FIG. 4.

Figure 3:
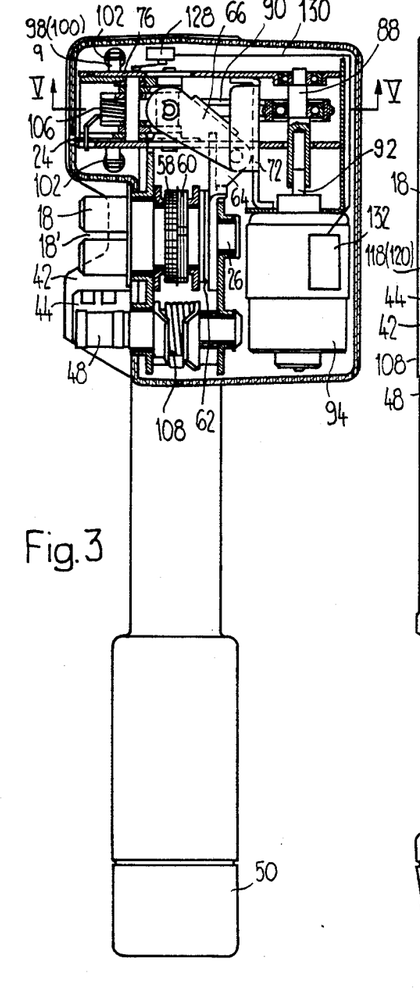
FIG. 3 shows a partial cross-sectional view of the left-hand portion of the tensioning and connecting apparatus of FIG. 2.
Figure 4:
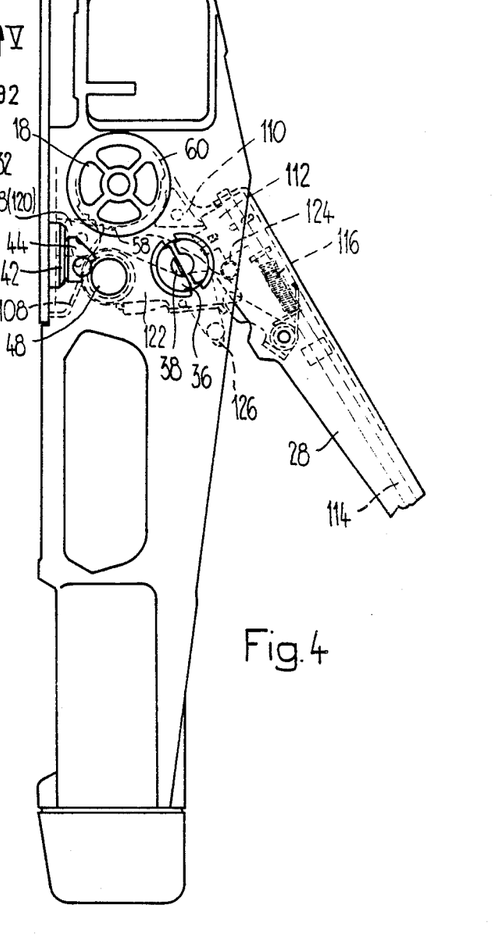
FIG. 4 shows a side view of the tensioning and connecting apparatus shown in FIG. 3.

The actuating lever 28 comprises a rotatable knob or control lever 32, rotatable around a longitudinal axis of the actuating lever 28 and used to actuate a switching or reversing mechanism, i.e. a selective engagement means 112 not particularly shown in FIG. 1 but in FIG. 4. By means of this selective engagement means 112, the actuating lever 28 can selectively engage either the tensioning device 18, 18' or the friction welding device 20, 20', as will be described in more detail in relation to FIGS. 3 and 4.

Situated subsequent to the tensioning device 18, 18' in the direction of a supply reel 40 for the synthetic or thermoplastic strap 14 is a cutter or severing mechanism 34 comprising a rotatable cutter 38 positioned in a cutter casing 36 and which is used to sever the strap 14 from the supply reel 40. The supply reel 40 is only symbolically illustrated. The remaining section of the strap 14 located between the cutter or knife 24 and the severing mechanism 34 is not usable due to the deformation caused by the slotted wheel 18 and is to be discarded.

A clamping member or shoe 44, coacting with a base 42, serves to engage the innermost strap end 14'. The clamping member or shoe 44 is pivotable around a pivot pin or journal 46, which is rigidly fixed to a rotatable shaft 48. The rotatable shaft 48 is biased under a counter-clockwise tension by a torsion spring 108 not particularly shown in FIG. 1, but depicted in FIG. 4, in such manner that the clamping member or shoe 44 comes to lie on the innermost strap end 14' and becomes self-locking due to the tension around the package or article 12 to be wrapped.

A battery compartment 50, for accommodating a preferably rechargeable battery, is positioned at the end of the tensioning and connecting apparatus 10 opposite the end where the friction welding device 20, 20' is located. An opening or cutout 52 located in the middle portion of the tensioning and connecting apparatus 10 serves as a passage for the hand of an operator and therefore assists in easier handling and manipulation of the tensioning and connecting apparatus 10.

Figure 2:
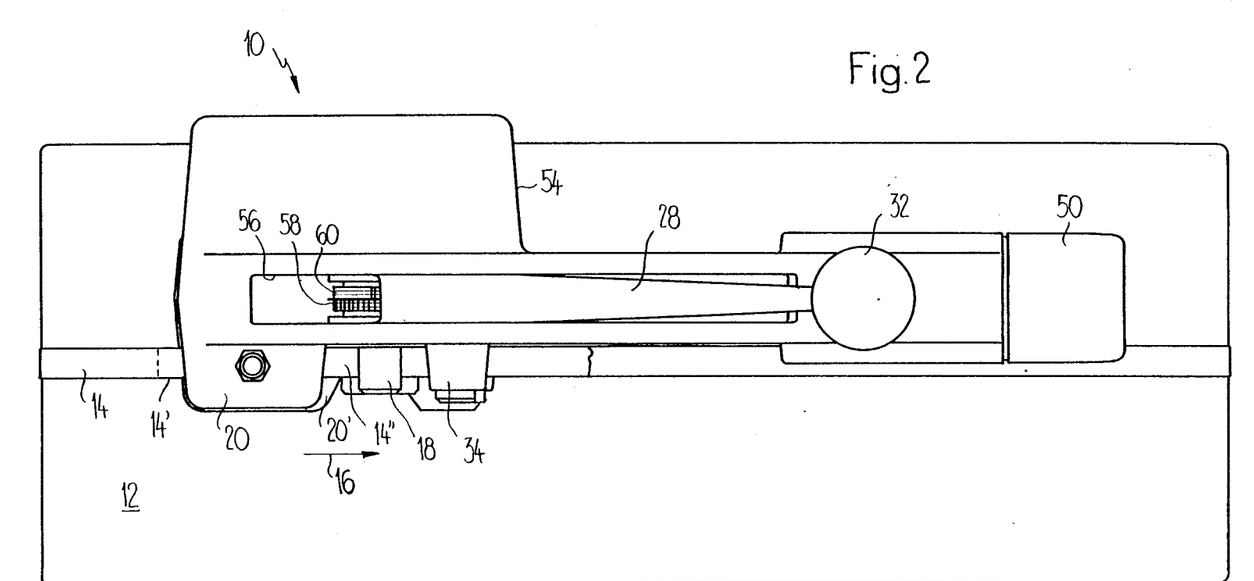
FIG. 2 shows a top plan view of the same illustrative embodiment as shown in FIG. 1.

The configuration of a casing 54 is particularly evident in the top plan view of the tensioning and connecting apparatus 10 illustrated in FIG. 2. The actuating lever 28 protrudes out of a slotted opening 56 in the top part of the casing 54. The ratchet wheel 58 already referred to is connected under biased torsion with the slotted wheel 18 and is visible through the slotted opening 56. A cam plate or disc 60 is positioned immediately adjacent to the ratchet wheel 58 on the same shaft which is used to actuate the friction welding device 20. The cam plate or disc 60 is not rotationally connected with the ratchet wheel 58. A selective engagement means or mechanism 112 is actuated by the rotating knob or control grip 32 and serves to effect a connection either between the actuating lever 28 and the ratchet wheel 58, or between the actuating lever 28 and the cam plate or disc 60.

According to FIG. 3, the cam plate or disc 60 is rotationally connected with a cam disc or plate 62 which bears upon a hinged or jointed lever 66 through a plunger or yoke 64.

Figure 5:
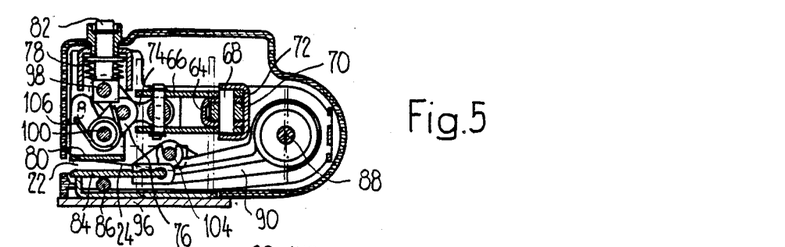
FIG. 5 shows a sectional view of the tensioning and connecting apparatus of FIG. 3 taken along the line V—V.

A support roller 70 is positioned on a hinge or pivot axis 68 of the joint or hinge between the plunger 64 and the hinged lever 66, as shown in FIG. 5. The support roller 70 is supported by a stationary mounting or bearing angle 72. The hinged lever 66 is connected with a bell crank lever 76 by means of a link plate 74. The bell crank lever 76 is supported at its upper end by a stationary supportive plate or cup spring 78, while its lower end is connected with a clamping shoe 80. The effect of the plate or cup spring 78 is adjustable using a set screw 82.

Figure 6:
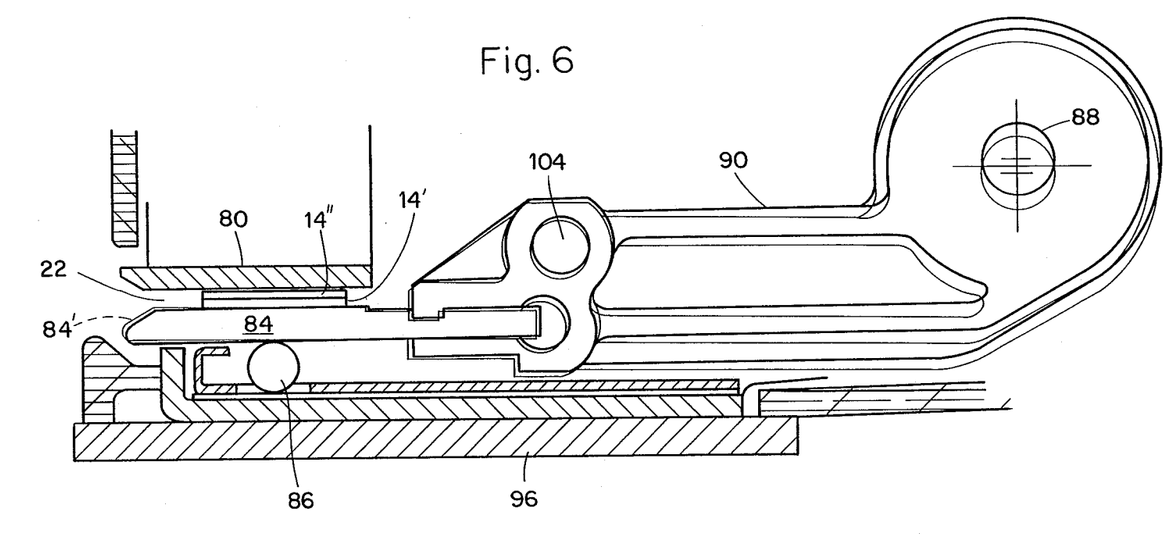
FIG. 6 shows an enlarged view of the drive nd support means for the oscillatable welding jaw in the tensioning and connecting apparatus shown in FIG. 5.

Below a gap 22 for accommodating the mutually overlapping innermost strap end 14' and outermost strap end 14" there is a welding element in the form of a welding jaw or tongue 84, which is positioned opposite to the clamping shoe 80 and which can be made to vibrate or oscillate. The welding jaw or tongue 84 is movable or translatable along a laterally guided roller 86 which serves as a rolling member, and is connected with a driving or connecting rod 90 driven by an eccentric mechanism or cam 88, see FIG. 6. In FIG. 3 it can be seen that the eccentric mechanism or cam 88 is connected with a shaft 92 of a motor 94 which reclines on its side.

A base plate 96 serves to support the tensioning and connecting apparatus 10 upon the article or package 12 to be wrapped, as illustrated in FIG. 1. According to FIG. 3, a tension spring 102 is positioned on each side of the clamping shoe 80 between the two hinge or pivot axes 98 and 100 of the bell crank lever 76 in order to return or reset the clamping shoe 80.

The cutter or knife 24, which has already been illustrated in FIG. 1, is coupled with the driving or connecting rod 90 by means of a cutter or knife pin 104, enabling synchronous movement and identical stroke with the welding jaw or tongue 84. A torsion spring 106, which is coupled to the clamping shoe 80, allows the cutter or knife 24 to be lowered on to the outermost strap end 14".

The pressure spring acting upon the clamping member or shoe 44 is recognizable in FIGS. 3 and 4 as a torsion spring 108 acting on the shaft 48. In FIG. 4 the ratchet wheel 58 and the cam plate or disc 60 are indicated behind the slotted wheel 18. An entrainment pawl 110 is associated with each of the ratchet wheel 58 and the cam plate or disc 60. Only one of these entrainment pawls 110, however, is engaged at one time by means of the selective engagement means 112 by actuating of the actuating liner 28 in the direction of the arrow 30. The selective engagement means 112 is actuated by a switching or selector shaft or rod 114 by turning the rotating knob or control grip 32 illustrated in FIGS. 1 and 2. A return spring 116 serves to return or reset the selective engagement means 112 so that in an idle state the connection of the actuating lever 28 is made with the ratchet wheel 58.

A releasable locking pawl 118, which acts as a catch or retention element or anti-return means preventing backward movement, engages the ratchet wheel 58. The cam plate or disc 60 is also caught and held in the lowered position of the clamping shoe 80 by a locking pawl 120, which is positioned behind the releasable locking pawl 118 and is therefore not visible in FIG. 4. Both the locking pawls 118 and 120 are released by a release member or lever 122 which is pivotable around the shaft 48. The release member or lever 122 is caused to pivot by a roller 124 positioned on the actuating lever 28 and is set into action by depressing the actuating lever 28 in a direction opposite to the direction of the arrow 30. This pivoting action also causes the clamping member or shoe 44 to be raised from the clamping base or anvil 42, thus releasing the strap 14. Furthermore, a rotatable cutter 38, positioned within the cutter or knife casing 36, is actuated by means of a lever 126 by depressing the actuating lever 28 in the direction opposite to the direction of the arrow 30, which causes a cutting or severance of the section of the strap or band 14 wrapped around the package or article 12 from the supply reel 40.

A switch 128, illustrated in FIG. 3, actuates the motor 94 during lowering or depression of the clamping shoe 80 by the bell crank lever 76. The switch 128 is connected by a wire or electrical conductor 130 in an electrical circuit to a counting device 132, which, after a predetermined number of vibrations or oscillations of the welding jaw or tongue 84, causes the motor 94 to be deactivated, thus ending the welding procedure.

The preferred embodiment of the tensioning and connecting apparatus hereinbefore described functions as follows:

The strap or band 14 of synthetic or thermoplastic material is taken from the supply reel 40 and placed around the package or article 12 to be wrapped. The innermost strap end 14' is inserted into the opened gap or space between the clamping base or anvil 42 and the clamping member or shoe 44 after depressing the actuating lever 28 of the tensioning and connecting apparatus 10 resting upon the package or article 12 to be wrapped. The innermost strap end 14' is clamped down and held by releasing the actuating lever 28. The overlapping strap ends 14' and 14" are laterally inserted into the gap 22 of the friction welding device 20, 20'. The outermost strap end 14", which is still connected with the supply reel 40, is inserted into the slot 18' of the slotted wheel 18 and into the cutting or severing mechanism 34. To apply tension to the strap 14 extending around the package or article 12 to be wrapped, the actuating lever 28 is moved in the direction of the arrow 30 as far as necessary and, if necessary, repeatedly with a back-and-forth motion until the strap 14 is sufficiently tensioned. The tensioning device represented by the slotted wheel 18 remains in the tensioned position because of the retentive effect of the locking pawl 118 on the ratchet wheel 58, even when the actuating lever 28 is returned to its initial position as illustrated in FIGS. 1 and 4. While in the initial position, the round rotating knob or control grip 32 is turned and the actuating lever 28 again moved an angular distance of about 90° in the direction of the arrow 30. This action causes the clamping shoe 80 (FIG. 5) to be lowered upon the overlapping innermost strap end 14' and the outermost strap end 14", thereby pressing them against the welding jaw or tongue 84. Just prior to reaching the final position of the clamping shoe 80, the motor 94 is actuated by the switch 128 (FIG. 3). In the final position the clamping shoe 80 is locked by arresting the cam plate or disc 60 by means of the locking pawl 120.

The welding procedure commences with the activation of the motor 94. The innermost free strap end 14' is rubbed by the welding jaw or tongue 84, which has a roughened surface, against the outermost strap end 14", which is held by the clamping shoe 80. The welding jaw or tongue 84 moves in a direction which is transverse to the longitudinal axis of the strap 14. The preferred length of the stroke is between 1 and 2 millimeters.

The transverse motion of the welding jaw or tongue 84 in the plane of the strap 14 can also cause the superimposition of a rotational movement along the longitudinal axis of the strap 14 as a result of the actuation by means of the eccentric mechanism or cam 88. Such a movement, composed of several components of motion, also allows for the satisfactory connection or welding of straps of thermoplastic material whose cross-section deviate from the ideal rectangular shape and, for example, correspond more to an ovoid shape.

The opposing surfaces of the mutually overlapping innermost strap end 14' and outermost strap end 14" which face each other are melted or fused in the vicinity of the welding jaw or a tongue 84 by the frictional heat produced during the vibrating or oscillating movement so that a connection of the mutually confronting inner surfaces located between the innermost strap end 14' and the outermost strap end 14" results. During the vibrating or oscillating movement of the welding jaw or tongue 84, the cutter or knife 24 is driven with the identical stroke as that of the welding jaw or tongue 84, thereby enabling a severance or cutting of the outermost strap end 14". The torsion spring 106 exerts a downward-acting force upon the cutter or knife 24. After the outermost strap end 14" has been cut or severed by the cutter or knife 24, this cutter or knife 24 rests upon the innermost strap end 14' without damaging it, as no relative motion exists between the cutter or knife 24 and the innermost strap end 14'.

After the motor 94 has been switched off as a function of the number of vibrations or oscillations executed by the welding jaw or tongue 84, the actuating lever 28 should be depressed in a direction opposite to the direction of the arrow 30, activating a total of four functions: the cutting or severing mechanism 34 cuts or severs from the supply reel 40 the portion of the strap 14 which was deformed by the slotted reel 18; the blocking of the slotted wheel 18, which at the same time serves as a retention means, is released; the clamping shoe 80 releases the connected, mutually welded overlapping innermost strap end 14' and outermost strap end 14"; and the clamping member or shoe 44 is raised in order to fully release the strap 14. Thereafter the tensioning and connecting apparatus 10 can be laterally removed from the strap 14, thereby ending the wrapping or banding procedure.

The tensioning and connecting apparatus 10 operates independently of any electrical power supply network, as the energization of the electric motor 94 used for friction welding is accomplished by a built-in rechargeable battery. Battery-powered operation is made possible by the relatively low power requirements of the motor 94, as only the free innermost strap end 14' has to be moved transverse to the longitudinal axis of the strap 14. A further significant advantage of the tensioning and connecting apparatus 10 lies in its simple operation. A single actuating lever 28 with a rotating knob or control grip 32 is provided to execute the complete plurality of operating functions. The operation is thereby not only simplified, but an expeditious method of operation is made possible. The built-in battery can be recharged using an electrical cable or conductor connected to an electrical power supply network.

While there are shown and described present preferred embodiments of the invention, it is to be distinctly understood that the invention is not limited thereto, but may be otherwise variously embodied and practiced within the scope of the following claims.

Accordingly, what I claim is:

1. An apparatus for tensioning a strap of synthetic naterial and connecting mutually overlapping ends of the strap of synthetic material, comprising:
   a tensioning device defining a direction of tensioning a strap of synthetic material having mutually overlapping ends;
   a friction welding device arranged upstream of said tensioning device in said direction of tensioning;
   said friction welding device including means defining a gap accomadating said mutually overlapping ends of said strap;
   said gap-defining means comprising a clamping shoe arranged at one side of said gap for substantially immobilizing an outermost end of said mutually overlapping ends of said strap;
   said gap-defining means further including a welding element arranged substantially directly opposite said clamping shoe at an opposite side of said gap;
   means for oscillating said welding element in relation to said clamping shoe generating frictional heat;
   a retention means for retaining said strap in a tensioned state upon tensioning thereof under the action of said tensioning device;
   said retention means being arranged downstream of said friction welding device in said direction of tensioning;
   said welding element comprising a welding tongue for engaging an innermost free end of said mutually overlapping ends of said strap;
   said oscillating means serving for oscillatingly driving said welding tongue with a to-and-fro oscillating motion substantially transverse to said mutually overlapping ends of said strap and to thereby move said innermost free end relative to said substantially immobilized outermost end and to this frictionally weld to each other said mutually overlapping ends of said strap;
   a cutter for severing said outermost end of said mutually overlapping ends of said strap; and
   said cutter being coupled to said welding tongue such that said cutter is driven synchronously with said welding tongue and with the same stroke as said welding tongue substantially without relative movement between said cutter and said innermost free end of said strap.

2. The apparatus as defined in claim 1, wherein:
   said retention means comprises an anti-return means integral with said tensioning device.

3. The apparatus as defined in claim 1, wherein: said tensioning device comprises a slotted wheel.

4. The apparatus as defined in claim 3, further including:
   an actuating lever; and
   means for operatively coupling said slotted wheel to said actuating lever.

5. The apparatus as defined in claim 4, wherein:
   said actuating lever is manually operable.

6. The apparatus as defined in claim 4, further including:
   means or coupling said clamping shoe to said actuating lever for depressing said clamping shoe.

7. The apparatus as defined in claim 6, wherein:
   said means for coupling said clamping shoe to said actuating lever contain a bell crank lever arranged between said actuating lever and said clamping shoe for depressing said clamping shoe.

8. The apparatus as defined in claim 7, wherein:
   said actuating lever comprises selective engagement means for selectively actuating a desired one of said tensioning device and said friction welding device.

9. The apparatus as defined in claim 1, further including:
   at least one rolling bearing member;
   said welding tongue bearing upon said at least one rolling bearing member; and
   said welding tongue being connected to drive means of said oscillating means for oscillatingly driving said welding tongue substantially transverse to said mutually overlapping ends of said strap and with a superimposed rotational movement about said longitudinal axis of said strap.

10. The apparatus as defined in claim 1, further including:
    a driving rod pivotably connected to said welding tongue; and
    an electric drive means of said oscillating means for driving said driving rod for oscillatingly driving said welding toungue substantially transverse and with said superimposed rotational movement.

11. The apparatus as defined in claim 10, further including:
    an electrical storage battery arranged within said apparatus;
    an electrical motor operatively coupled to said eccentric drive means; and
    electrical circuit means switchably connecting said electrical motor to said electrical storage battery.

12. The apparatus as defined in claim 11, wherein:
    said electrical motor comprises a direct-current electrical motor.

13. The apparatus as defined in claim 1, further including:
    an adjustable Belleville washer spring for resiliently mounting said clamping shoe.

14. The apparatus as defined in claim 1, further including:
    a spring for biasing said cutter toward said outermost end of said mutually overlapping ends of said strap; and
    means for depressing said cutter conjointly with said clamping shoe.

15. The apparatus as defined in claim 1, further including:
    at least one rolling bearing member supporting said welding tongue;
    a driving rod connected to said welding tongue; and eccentric drive means for driving said driving rod and thereby said welding tongue with said to-and-fro oscillating movement substantially transverse to said mutually overlapping ends of said strap.

16. The apparatus as defined in claim 4, wherein said actuating lever constitues a dual-function actuating lever for selectively carrying out either one of the tensioning operation and the friction-welding operation.

17. An apparatus for tensioning and connecting mutually overlapping ends of a strap of synthetic material, comprising:
   a tensioning device defining a direction of tensioning;
   a friction welding device arranged upstream of said tensioning device in said direction of tensioning;
   said friction welding device including means defining a gap for accommodating said mutually overlapping ende of said strap;
   said gap-defining means comprising a clamping shoe arranged at one side of said gap for immobilizing an outermost end of said mutually overlapping ends of said strap;
   said gap-defining means futher including a welding element arranged opposite said clamping shoe at an opposite side of said gap;
   means for oscillating said welding element in relation to said clamping shoe for generating frictional heat;
   a retention means for retaining said strap in a tensioned state;
   said retention means being arranged downstream of said friction welding device in said direction of tensioning;
   said welding element comprising a welding tongue for engaging an innermost free end of said mutually overlapping ends of said strap;
   means for oscillatingly driving said welding tongue substantially transverse to said strap for moving said innermost free end relative to said outermost end;
   said tensioning device comprising a slotted wheel;
   an actuating lever;
   means for operatively coupling said slotted wheel to said actuating lever;
   a bell crank lever aranged between said actuating lever and said clamping shoe for depressing said clamping shoe;
   said actuating lever comprising selective engagement means for selectively actuating a desired one of said tensioning device and said friction welding device;
   a transmission linkage operatively interconnecting said actuating lever and said friction welding device; said tensioning device comprising a ratchet wheel;
   said actuating lever comprising a rotatable knob for actuating said selective engagement means; and
   said selective engagement means having a first position for establishing an operative connection between said actuating lever and said ratchet wheel and a second position for establishing an operative connection between said actuating lever and said transmission linkage.

18. The apparatus as defined in claim 17, wherein: said transmission linkage comprises a cam disk journalled coaxially with said ratchet wheel and a connecting link operatively connecting said cam disk to said bell crank lever.

19. The apparatus as defined in claim 17, wherein: said selective engagement means comprises a return spring for returning said selective engagement means from its second position into its first position and into operative connection with said ratchet wheel.

20. The apparatus as defined in claim 17, wherein:
   said means for oscillatingly driving said driving tongue substantially tranverse to said mutually overlapping ends of said strap contain an electric motor;
   an electrical switch for energizing said electrical motor; and
   said transmission linkage being operatively connected to said electrical switch such that said electrical switch energizes said electrical motor before a predetermined axial clamping pressure exerted by said clamping shoe is reached.

21. The apparatus as defined in claim 17, further including:
   a pawl for arresting said transmission linkage when said clamping shoe is in a depressed position;
   said retention means containing anti-return means comprising a further pawl engaging said ratchet wheel, and
   a release member for connecting said pawl and said further pawl with said actuating lever for unlatching said pawls when said actuating lever is actuated up to the region of a stop means in a direction opposed to a tensioning direction of the actuating lever.

22. The apparatus for tensioning a strap of synthetic material and connecting mutually overlapping ends of the strap of synthetic material, comprising:
   a tensioning device defining a direction of tensioning a strap of synthetic material having mutually overlapping ends;
   a friction welding device arranged upstream of said tensioning device in said direction of tensioning;
   said friction welding device including means defining a gap for accommodating said mutually overlapping ends of said strap;
   said gap-defining means comprising a clamping shoe arranged at one side of said gap for substantially immobilizing an outermost end of said mutually overlapping ends of said strap;
   said gap-defining means further including a welding element arranged substantially directly opposite said clamping shoe at an opposite side of said gap;
   means for oscillating said welding element in relation to said clamping shoe for generating frictional heat;
   a retention means for retaining said strap in a tensioned state upon tensioning thereof under the action of said tensioning device;
   said retention means being arranged downstream of said friction welding device in said direction of tensioning;
   said welding element comprising a welding tongue for engaging an innermost free end of said mutually overlapping ends of said strap;
   said oscillating means serving for oscillatingly driving said welding tongue substantially transverse to said mutually overlapping ends of said strap and to thereby move said innermost free end relative to said substantially immobilize outermost end and to thus frictionally weld to each other said mutually overlapping ends of said strap;
   an electrical circuit comprising at least an electrical motor and an electrical switch for interrupting said electrical circuit; and
   means for actuating said electrical switch in dependence of a predetermined number of oscillatory strokes performed by said welding tongue.

* * * * *